(12) United States Patent
Naoi

(10) Patent No.: US 8,315,000 B2
(45) Date of Patent: Nov. 20, 2012

(54) IMAGE PICKUP LENS, IMAGE PICKUP APPARATUS AND MOBILE TERMINAL

(75) Inventor: Yuki Naoi, Kawasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 23 days.

(21) Appl. No.: 12/934,907

(22) PCT Filed: Mar. 17, 2009

(86) PCT No.: PCT/JP2009/055135
§ 371 (c)(1),
(2), (4) Date: Sep. 27, 2010

(87) PCT Pub. No.: WO2009/122897
PCT Pub. Date: Oct. 8, 2009

(65) Prior Publication Data
US 2011/0025903 A1 Feb. 3, 2011

(30) Foreign Application Priority Data

Mar. 31, 2008 (JP) ................. 2008-090008

(51) Int. Cl.
*G02B 9/34* (2006.01)
*G02B 15/14* (2006.01)

(52) U.S. Cl. ........ 359/773; 359/771; 359/772; 359/686; 359/715; 348/340

(58) Field of Classification Search .......... 359/644, 359/660, 686, 687, 771–773, 715; 348/240.99, 348/335, 340, E5.024
See application file for complete search history.

(56) References Cited

U.S. PATENT DOCUMENTS

| | | | | |
|---|---|---|---|---|
| 6,111,703 A | * | 8/2000 | Hozumi | 359/772 |
| 7,009,783 B2 | * | 3/2006 | Do | 359/754 |
| 7,012,765 B2 | * | 3/2006 | Matsui et al. | 359/771 |
| 7,215,492 B2 | * | 5/2007 | Sato et al. | 359/773 |
| 7,321,474 B1 | | 1/2008 | Jo | |
| 7,920,333 B2 | * | 4/2011 | Ohtake | 359/687 |

FOREIGN PATENT DOCUMENTS

| | | |
|---|---|---|
| JP | 2002-365529 | 12/2002 |
| JP | 2002-365530 | 12/2002 |
| JP | 2004-341013 | 12/2004 |
| JP | 2007-17984 | 1/2007 |
| JP | 2007-108534 | 4/2007 |
| JP | 2007-286153 | 11/2007 |
| JP | 2008-185880 | 8/2008 |
| JP | 2008-242180 | 10/2008 |

* cited by examiner

*Primary Examiner* — Loha Ben
(74) *Attorney, Agent, or Firm* — Cozen O'Connor

(57) ABSTRACT

Provided are a small image pickup lens which ensures a wide angle of view, permits various aberrations to be excellently corrected and is applicable to an image pickup element having a high pixel density, an image pickup apparatus using the image pickup lens, and a mobile terminal using the image pickup apparatus. The image pickup lens employs a structure which includes, in order from the object side, an aperture stop, a first lens with positive refractive power, a second lens with negative refractive power, a third lens with positive refractive power, and a fourth lens with negative refractive power, and the image pickup lens is designed to satisfy predetermined conditional expressions.

9 Claims, 10 Drawing Sheets

SPHERICAL ABERRATION

ASTIGMATISM

DISTORTION

FIG. 9
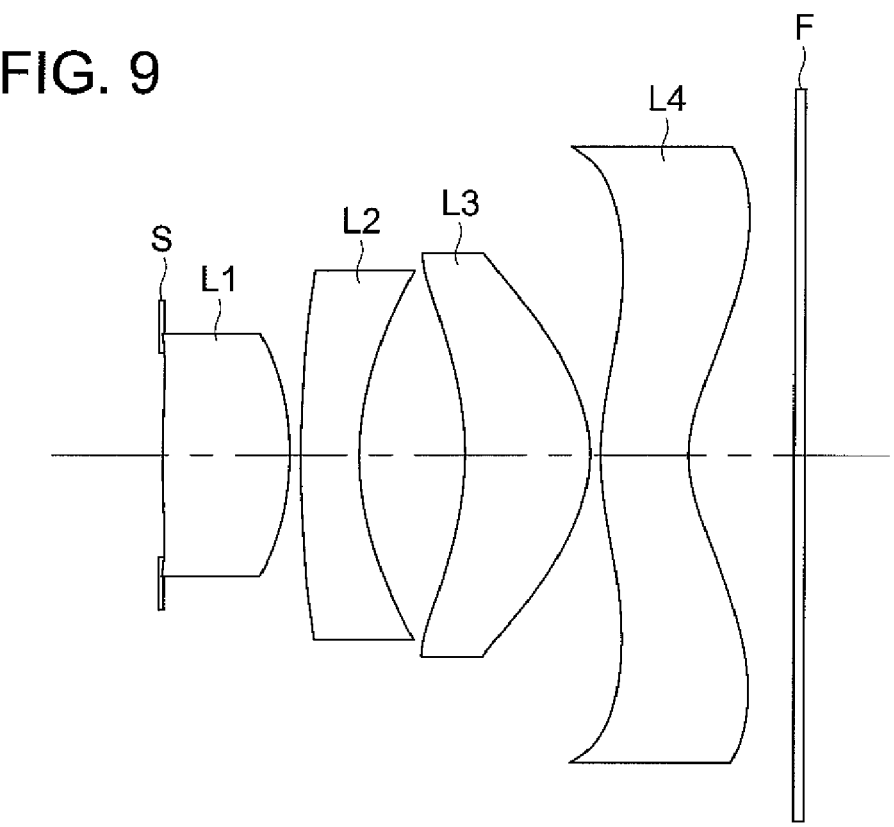
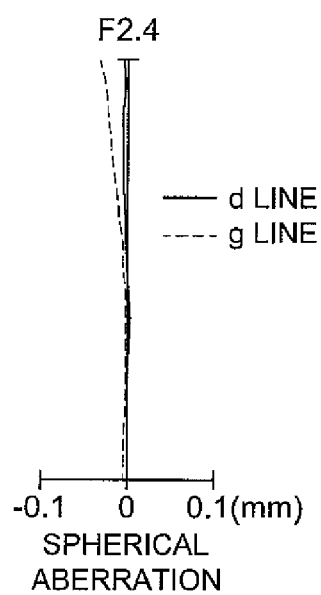
FIG. 10a
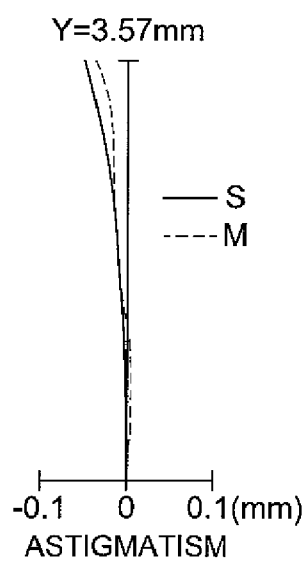
FIG. 10b
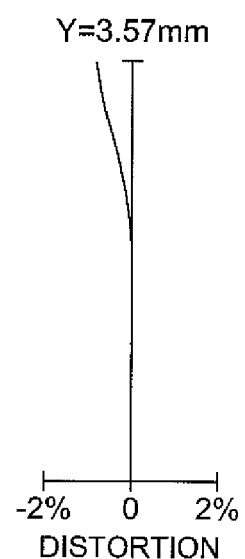
FIG. 10c

SPHERICAL
ABERRATION

ASTIGMATISM

DISTORTION

SPHERICAL ABERRATION

ASTIGMATISM

DISTORTION

SPHERICAL ABERRATION

ASTIGMATISM

DISTORTION

IMAGE PICKUP LENS, IMAGE PICKUP APPARATUS AND MOBILE TERMINAL

RELATED APPLICATIONS

This application is a U.S. National Phase Application under 35 U.S.C. 371 of International Application PCT/JP2009/055135 filed Mar. 17, 2009.

This application claims the priority of Japanese application 2008-090008 filed Mar. 31, 2008, the entire content of which is hereby incorporated by reference.

TECHNICAL FIELD

The present invention relates to a small-sized image pickup lens, an image pickup apparatus and a mobile terminal equipped with the image pickup lens, employing a solid-state image pickup element such as a CCD type image sensor or a CMOS type image sensor.

BACKGROUND ART

Conventionally, a compact and thin-type image pickup apparatus has come to be mounted on a mobile terminal representing a compact and thin-type electronic device such as a cell phone and PDA (Personal Digital Assistant), whereby, it has become possible to transmit mutually not only voice information but also image information to a remote location.

As an image pickup element used for these image pickup apparatus, a solid-state image pickup element such as CCD (Charge Coupled Device) type image sensor or CMOS (Complementary Metal-Oxide Semiconductor) type image sensor is used.

Recently, following enlargement of the spread of these mobile terminals, a mobile terminal on which an image pickup apparatus employing an image pickup element with high pixel density is mounted in order to take images with high quality is being supplied on the market. This image pickup apparatus sometimes employs an image pickup lens formed of plural lenses in order to enhance the resolution, corresponding to the image pickup element with high pixel density.

As an image pickup lens used for a compact and high-performance image pickup apparatus provided with such an image pickup element with high pixel density, an image pickup lens of four-element structure has been proposed because it can achieve higher performance as compared with an image pickup lens of two- or three-element structure.

As this image pickup lens of four-element structure, there has been disclosed the so-called inverted-Ernostar type image pickup lens which includes, in order from the object side, a first lens with positive refractive power, a second lens with negative refractive power, a third lens with positive refractive power, and a fourth lens with positive refractive power with aiming an enhancement of its performance (for example, refer to Patent Literature 1).

Further, there has been discloses the so-called telephoto type image pickup lens which includes, in order from the object side, a first lens with positive refractive power, a second lens with negative refractive power, a third lens with positive refractive power, and a fourth lens with negative refractive power with aiming downsizing of the total length of the image pickup lens, which is represented as a distance along the optical axis from the lens surface arranged at the position closest to the object side in the total system of the image pickup lens to a focal point at the image side (for example, refer to Patent Literatures 2 and 3).

Patent Literature 1: JP-A No. 2004-341013
Patent Literature 2: JP-A No. 2002-365529
Patent Literature 3: JP-A No. 2002-365530

DISCLOSURE OF THE INVENTION

Problems to be Solved by the Invention

However, the image pickup lens written in the above Patent Literature 1 has a disadvantage for downsizing, because the image pickup lens is the inverted Ernostar type which has a positive fourth lens, and it makes a position of the principal point of the optical system closer to the image side and the back focal length becomes long. Furthermore, the four lenses include only one lens with negative refractive power. Therefore, it is difficult to correct Petzval sum, and an excellent performance is hardly ensured at the peripheral portion of an image plane.

Further, in the image pickup lenses written in the above Patent Literatures 2 and 3, an angle of view for photographing is narrow, and aberrations are insufficiently corrected. Therefore, when the total length is further shortened, the performance is so deteriorated and the image pickup lenses hardly copes with an image pickup element with a higher pixel density, which is a problem.

The present invention is achieved in view of the above problems, and aims to obtain a small image pickup lens which ensures a wide angle of view, permits various aberrations to be excellently corrected and is applicable to an image pickup element with a high pixel density.

As for a dimension of a small image pickup lens with wide angle of view, the present invention aims downsizing and a wide angle of view at the level satisfying the following expressions (7) and (8). Satisfying these ranges realizes to compose a small image pickup lens with a wide angle of view.

$$L/2Y<1.2 \tag{7}$$

$$f/2Y<0.8 \tag{8}$$

In the expressions, L represents a distance along the optical axis from the lens surface arranged at the closest position to the object side in the total system of the image pickup lens to the focal point at the image side, 2Y represents a diagonal length of an image pickup surface of a solid-state image pickup element (a diagonal length of a rectangular effective pixel area of the solid-state image pickup element), and f represents a focal length of the total system of the image pickup lens.

In the above description, "focal point at the image side" means an image point formed when a parallel ray which is parallel with the optical axis enters a lens. When there is arranged a parallel flat plate such as an optical low-pass filter, an infrared blocking filter and a sealing glass of a solid-state image pickup element package, at a position between the lens surface arranged at the closest position to the image side in the image pickup lens and the focal point at the image side, the value of L is calculated on the assumption that a space of the parallel flat plate is regarded as a distance converted into the air.

Solution to Problem

The above object will be achieved by the invention which will be described below.

The present image pickup lens is an image pickup lens for forming an image of a subject onto a photoelectric conversion section of a solid-state image pickup element. The image pickup lens comprises, in order from an object side thereof: an aperture stop; a first lens with a positive refractive power; a second lens with a negative refractive power; a third lens with a positive refractive power; and a fourth lens with a negative refractive power, wherein the image pickup lens satisfies the following conditional expressions (1) and (2):

$$0.29 \leq (r1+r2)/(r1-r2) < 0.9 \tag{1}$$

$$0.80 < (r3+r4)/(r3-r4) < 5.1. \tag{2}$$

In these conditional expressions, r1 is a curvature radius of an object-side surface of the first lens, r2 is a curvature radius of an image-side surface of the first lens, r3 is a curvature radius of the object-side surface of the second lens, and r4 is a curvature radius of an image-side surface of the second lens.

The basic structure of the present invention includes, in order from the object side: an aperture stop; a first lens with a positive refractive power; a second lens with a negative refractive power; a third lens with a positive refractive power; and a fourth lens with a negative refractive power, in order to obtain a small image pickup lens in which various aberrations are excellently corrected. In this lens structure, a positive lens group including the first lens to third lens, and a negative fourth lens are arranged, in order from the object side, which is a so-called telephoto type structure. Such a lens structure is advantageous to downsize the total lens length.

Further, by forming two elements in the four-element lens into negative lenses, the number of surfaces with divergent action increases and Petzval sum is easily corrected, which enables to provide an image pickup lens ensuring an excellent image-forming performance up to the peripheral portion of the image plane in spite of its wide angle of view.

In addition, by providing the aperture stop arranged at a position closest to the object side, the exit pupil position can be placed to be farther from an image pickup surface. It suppresses an incident angle of the principal ray (which is an angle formed between the principal ray and the optical axis) of the light flux forming an image on the peripheral portion of the image pickup surface of the solid-state image pickup element to be small, and secures so-called telecentricity. Further, even when a mechanical shutter is necessary, it can be arranged at the most object side, and the image pickup lens whose total length is short, can be obtained.

The conditional expression (1) is an expression for adequately setting the shape of the first lens. The first lens has the shape such that the image-side surface has stronger positive refractive power than the object-side surface within the range of this conditional expression. When the conditional expression (1) is smaller than the upper limit, the positive refractive power of the image-side surface of the first lens does not become excessively strong. Thereby, generation of the coma, curvature of field, and chromatic aberration which are generated because the peripheral portion of the image-side surface of the second lens has excessively strong negative power, can be suppressed. When the conditional expression (1) is larger than the lower limit, space arises at the object side of the peripheral portion of the first lens and a stop is easily arranged, which easily downsizes the total length.

The conditional expression (2) is a condition for adequately setting the shape of the second lens. The second lens has the shape such that the image-side surface has stronger negative refractive power than the object-side surface within the range of this conditional expression.

When the conditional expression (2) is larger than the lower limit, the refractive power of the image-side surface of the second lens can be strengthened, and the coma, curvature of field, astigmatism, and chromatic aberration can be easily corrected. On the one hand, the radius of the object-side surface of the second lens becomes soft, and aberrations of the off-axis light flux passing a portion around the peripheral edge of this surface can be suppressed. When the conditional expression (2) is smaller than the upper limit, the negative refractive power of the image-side surface of the second lens is suppressed not to become too strong, and aberrations can be corrected in a balanced condition. Further, it allows that the curvature radius of the image-side surface is not too small, and that it has the shape without problem of the lens manufacturing.

In the present image pickup lens the fourth lens has a shape including a convex surface facing the object side. This structure strengthens positive refractive power of an air lens formed between the third lent and the fourth lens. Therefore, telecentricity of a light flux to be converged onto a peripheral portion of an image pickup surface can be ensured easily.

In the present image pickup lens the first lens satisfies the following conditional expression (3):

$$0.55 < f1/f < 1.1. \tag{3}$$

In the conditional expression, f1 is a focal length of the first lens, and f is a focal length of a total system of the image pickup lens.

The conditional expression (3) is an expression for adequately setting the refractive power of the first lens. When the conditional expression (3) is larger than the lower limit, the refractive power of the first lens does not become excessively strong, and the spherical aberration and coma can be suppressed small and finely. Further, when the conditional expression (3) is smaller than the upper limit, the refractive power of the first lens is adequately secured, and the total length of the image pickup lens can be reduced and the size-reduction becomes possible.

In the present image pickup lens an image-side surface of the fourth lens is formed in an aspheric shape having negative refractive power which becomes smaller at a position on the surface, as the position becomes more distant from an optical axis toward a peripheral portion, and the aspheric shape includes an inflection point.

By forming the image-side surface of the fourth lens in an aspheric shape having negative refractive power which becomes smaller at a position on the surface, as the position becomes more distant from an optical axis toward a peripheral portion, and including an inflection point, telecentricity of a light flux at the image side is easily ensured. Further, there is no need for the image-side surface of the second lens to have excessively weak negative refractive power at the peripheral portion of the lens, and off-axis aberrations can be corrected in an excellent condition.

In the present specification, "an inflection point" is a point on an aspheric surface at which a tangential plane at a peak of the aspheric surface is perpendicular to the optical axis in a curve of sectional shape of the lens within an effective radius.

In the present image pickup lens the third lens satisfies the following conditional expression (4):

$$1.4 < (r5+r6)/(r5-r6) < 2.5. \tag{4}$$

In the conditional expression (4), r5 is a curvature radius of the object-side surface of the third lens, and r6 is a curvature radius of an image-side surface of the third lens.

The conditional expression (4) is an expression for adequately setting the shape of the third lens. When the conditional expression (4) is larger than the lower limit, the refractive power of the third lens does not become excessively large, and a spherical aberration and coma can be controlled to be small and in an excellent condition. Further, a sag amount of the image-side surface of the third lens does not become excessively large and the surface has a shape which is easily formed. When the conditional expression (4) is smaller than the upper limit, the refractive power of the third lens is sufficiently maintained and the refractive power of the first lens is controlled not to be excessively large at the same time. Therefore, the total length of the image pickup lens can be shortened with controlling spherical aberration and coma, which shortens the total length of the image pickup lens and allows the downsizing of the image pickup lens.

In the present image pickup lens the first lens and the second lens satisfy the following conditional expression (5):

$$25 < \nu 1 - \nu 2 < 65. \tag{5}$$

In the conditional expression, ν1 is an Abbe number of the first lens, and ν2 is an Abbe number of the second lens.

The conditional expression (5) is an expression for adequately correcting chromatic aberrations in the total system of the image pickup lens. When the conditional expression (5) is larger than the lower limit, longitudinal chromatic aberration and chromatic aberration of magnification can be corrected in a balanced condition. When the conditional expression (5) is smaller than the upper limit, the lens can be formed of an optical material which is easily available.

In the present image pickup lens the second lens satisfies the following conditional expression (6):

$$1.6 < n2 < 2.1. \tag{6}$$

In the conditional expression, n2 is a refractive index of the second lens.

The conditional expression (6) is an expression for adequately correcting aberrations in the total system of the image pickup lens. When the conditional expression (6) is larger than the lower limit, coma, field of curvature, chromatic aberration can be corrected in a balanced condition, and the curvature of the image-side surface of the second lens can be controlled to be small. When the conditional expression (6) is smaller than the upper limit, the lens can be formed of an optical material which is easily available.

In the present image pickup lens each of the first lens and second lens is formed of a glass material, and each of the third lens and fourth lenses is formed of a plastic material.

When all the lenses forming the image pickup lens are formed by plastic lenses which are manufactured by injection molding, it is advantageous for the image pickup lens to reduce the size and weight and to save a cost. However, refractive index of plastic materials greatly change when a temperature changes, and a position of the image point of the total system of lens can be changed by the temperature change, which is a problem.

To solve the problem, the first lens with positive refractive index and the second lens with negative refractive index are formed of glass material whose refractive index is hardly changed when the temperature changes, and the third lens with positive refractive power and the fourth lens with negative refractive power are formed of plastic material. Thereby, they act in a direction so as to offset their contributions to the fluctuation in the position of image point caused when the temperature changes each other, which enables to compensate the fluctuation in position of the image point caused when the temperature changes in the total system of the image pickup lens.

By forming the first lens of glass material, the image pickup lens can be structured without plastic lenses exposed, which prevents a problem such as scratches on the first lens and provides a preferable structure.

The expression "is formed of plastic material" is defined to include a situation that there is provided a plastic material as a base member and its surface is coated, aiming to prevent reflection and to enhance a hardness of the surface.

An image pickup apparatus is also described which comprises the present image pickup lens, wherein each of the first lens and second lens is formed of a glass material, and each of the third lens and fourth lens is formed of a plastic material. Thereby, the image pickup apparatus is downsized and more enhanced in terms of quality.

A mobile terminal is also described which comprises the above image pickup apparatus. Thereby, the mobile terminal is downsized and more enhanced in terms of quality.

Effects of the Invention

According to the present invention, there can be provided a small image pickup lens which ensures a wide angle of view, permits various aberrations to be excellently corrected and is applicable to an image pickup element having a high pixel density. Further, there can be provided a small image pickup apparatus with high quality, and a small mobile terminal with high quality.

BRIEF DESCRIPTION OF DRAWINGS

FIG. 9 shows a sectional view taken along the optical axis of the image pickup apparatus including the image pickup lens of Example 3.

FIGS. 10a to 10c show aberration diagrams of Example 3 including spherical aberration (FIG. 10a), astigmatism (FIG. 10b), and distortion (FIG. 10c), respectively.

REFERENCE SIGNS LIST

S Aperture stop
L1 First lens
L2 Second lens
L3 Third lens
L4 Fourth lens
F Parallel flat plate
50 Image pickup apparatus
51 Image pickup element
52 Substrate
53 Casing
55 Lens frame

BEST MODE FOR CARRYING OUT THE INVENTION

The present invention will be described below by using embodiments. However, the scope of the invention is not limited to them.

Figure 1:
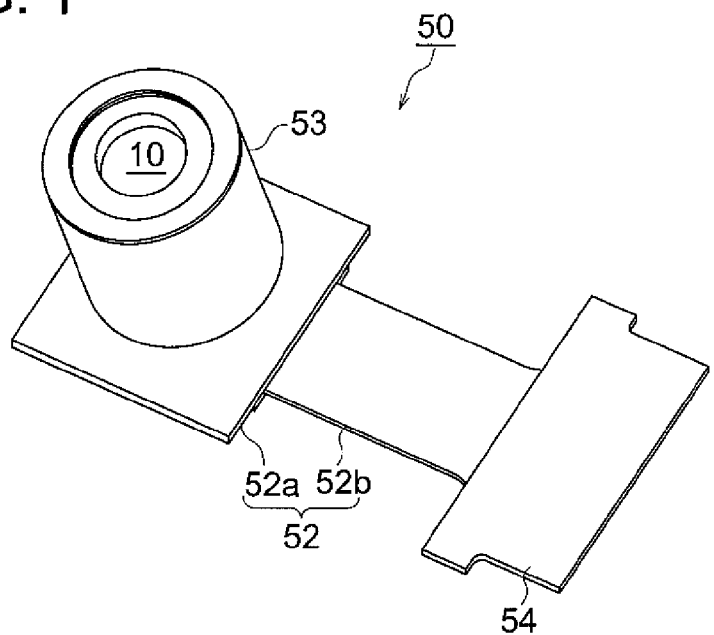
FIG. 1 shows a perspective view of an image pickup apparatus relating to the present embodiment.
Figure 2:
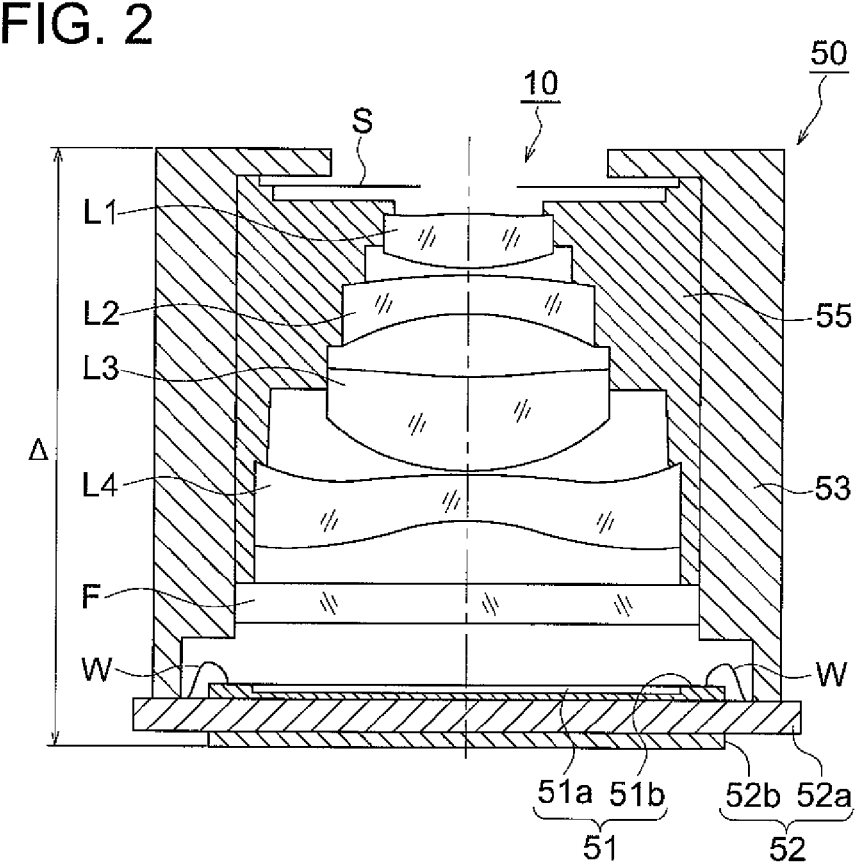
FIG. 2 shows a diagram schematically showing a cross-section taken along the optical axis of the image pickup lens of the image pickup apparatus relating to the present embodiment.

FIG. 1 is shows a perspective view of image pickup apparatus 50 relating to the present embodiment. FIG. 2 shows a diagram schematically showing the cross-section taken along the optical axis of the image pickup lens of image pickup apparatus 50 relating to the present embodiment.

As shown in FIG. 1 and FIG. 2, image pickup apparatus 50 is provided with: CMOS type image pickup element 51 as the solid-state image pickup element having photoelectric conversion section 51a; image pickup lens 10 for forming a subject image onto photoelectric conversion section 51a of this image pickup element 51; casing 53 as a lens barrel formed of the light shielding member, having an aperture section for the incident light from the object side; supporting substrate 52a supporting image pickup element 51; and flexible print substrate 52b having a terminal for an external connection (called also an external connecting terminal) 54 sending and receiving electric signal. They are integrally formed in one body.

As shown in FIG. 2, image pickup element 51 includes photoelectric conversion section 51a representing a light-receiving section on the central portion of a plane surface on the light-receiving side of the image pickup element 51, and includes signal processing circuit 51b formed to surround the photoelectric conversion section. On the photoelectric conversion section 51a, pixels (photoelectric conversion elements) are arranged on a two-dimensional basis. The signal processing circuit 51b is composed of a drive circuit that obtains signal electric charges by driving respective pixels in succession, A/D converting section that converts each signal electric charge into digital signal and of a signal processing section that forms an output of image signal by using the digital signal.

In the vicinity of the outer edge of the surface on the light-receiving side of image pickup element 51, many pads which are not illustrated are provided and connected to support substrate 52a through bonding wires W. The image pickup element 51 converts the signal charge from the photoelectric conversion section 51a into image signal such as digital YUV signal, and outputs it to a predetermined circuit on the support substrate 52a through bonding wires W. Y represents luminance signal, U (=R−Y) represents color difference signal between red and the luminance signal, and V (=B−Y) represents color difference signal between blue and the luminance signal.

Hereupon, the image pickup element is not limited to the above-described CMOS type image sensor, but may be an element in which the other element such as CCD is applied.

Substrate 52 is structured by hard support substrate 52a and flexible print substrate 52b. The hard support substrate supports image pickup element 51 and casing 53 by its one surface. One end of flexible print substrate 52b is connected to the other surface (the opposing surface to image pickup element 51) of the support substrate 52a. On the support substrate 52a, many signal transmission pads are provided on the both of the front and rear surfaces. They are connected to image pickup element 51 through bonding wires W on the one surface, and are connected to the flexible print substrate 52b on the other surface.

In the flexible print substrate 52b, as shown in FIG. 1, one end part is connected to support substrate 52a, and support substrate 52a is connected with an unillustrated external circuit (for example, a control circuit provided by the higher level of apparatus on which the image pickup apparatus is mounted) through external connecting terminal 54 arranged on the other end part, which enables that voltage for driving image pickup element 51 or the clock signal is supplied to the flexible print substrate 52b from the external circuit and that the digital YUV signal is outputted to the external circuit. Furthermore, the flexible print substrate 52 has the flexibility, and the intermediate part is deformed to give freedom to the support substrate 52a in terms of the direction or the arrangement of the external connecting terminal 54.

As shown in FIG. 2, casing 53 is fixedly arranged on a surface of support substrate 52a which is a surface facing the image pickup element 51 so as to cover the image pickup element 51. That is, one side of the casing 53 facing the image pickup element 51 has a widely opened shape so as to surround the image pickup element 51 and is contacted and fixed to the support substrate 52a. The other side of the casing 53 is formed in a cylindrical shape having a flange with a small opening.

Inside of casing 53, a parallel flat plate F assuming an optical low-pass filter, infrared blocking filter, and a sealing glass of a solid-state image pickup element is fixedly arranged at a position between the image pickup lens 10 and the image pickup element 51.

The image pickup lens 10 is provided with, in the order of object side, aperture stop S, first lens L1 with positive refractive power, second lens L2 with negative refractive power, third lens L3 with positive refractive power, and the fourth lens L4 with negative refractive power, and it is structured in such a manner that a subject image is formed on photoelectric conversion surface 51a of image pickup element 51. In FIG. 1, the upper side represents the object side, and the lower side represents the image side. One-dotted chain line in FIG. 2 represents the optical axis which is common in first to fourth lenses L1-L4.

First to fourth lenses L1-L4 forming image pickup lens 10 are held by lens frame 55. Casing 53 houses this lens frame 55 and the image pickup lens 10 held by the lens frame 55. The lens frame 55 is engaged with the casing 53 at its outer periphery, and is contacted with the flange section having a small opening of the casing 53 to be positioned.

Further, although it is not illustrated, a fixed stop to cut unnecessary light may be arranged in a space between first to fourth lenses L1-L4. Particularly, it is preferable that the stop is arranged at a position between the third lens L3 and the fourth lens L4, or between the fourth lens 4 and the infrared ray blocking filter F. Generation of ghost and flare light can be suppressed when a rectangular fixed stop is arranged outside a light path.

Figure 3:
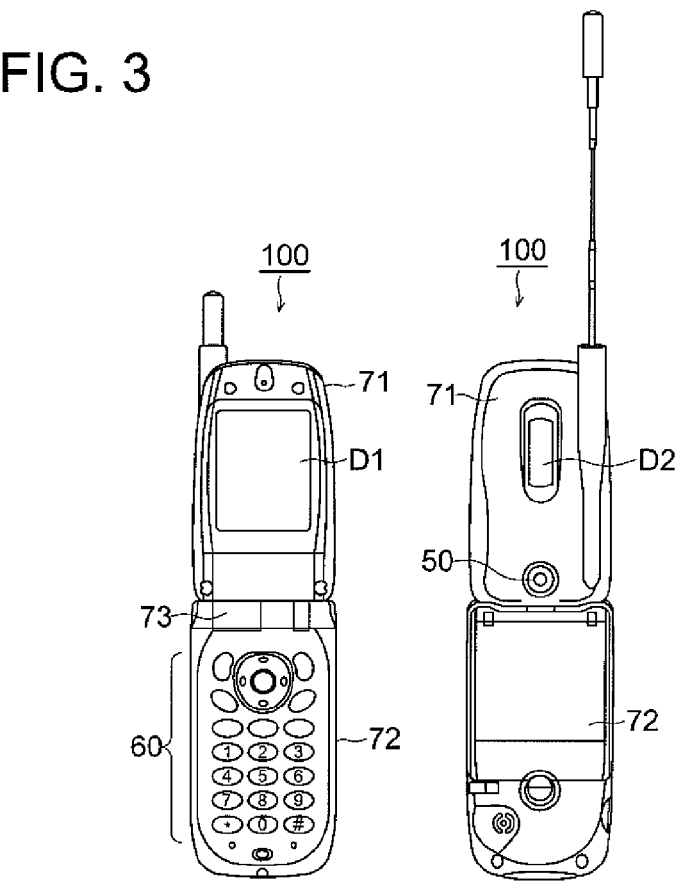
FIG. 3 shows outline views of a cell phone which is an example of a mobile terminal employing an image pickup apparatus.

FIG. 3 shows outline views of cell phone 100 which is an example of a mobile terminal employing image pickup apparatus 50. In cell phone 100 shown in the figure, upper casing 71 as a case provided with the display screens D1 and D2, and lower casing 72 provided with operation buttons 60 which is an input section, are connected together through hinge 73. Image pickup apparatus 50 is housed below the display screen D2 in upper casing 71, and image pickup apparatus 50 is arranged in such a manner that light can be taken from the outer-surface side of upper casing 71.

This image pickup apparatus may also be arranged above the display screen D2 of upper casing 71 or on the side surface of upper casing 71. Further, it is naturally understood that the cell phone is not limited to a folding type.

Figure 4:
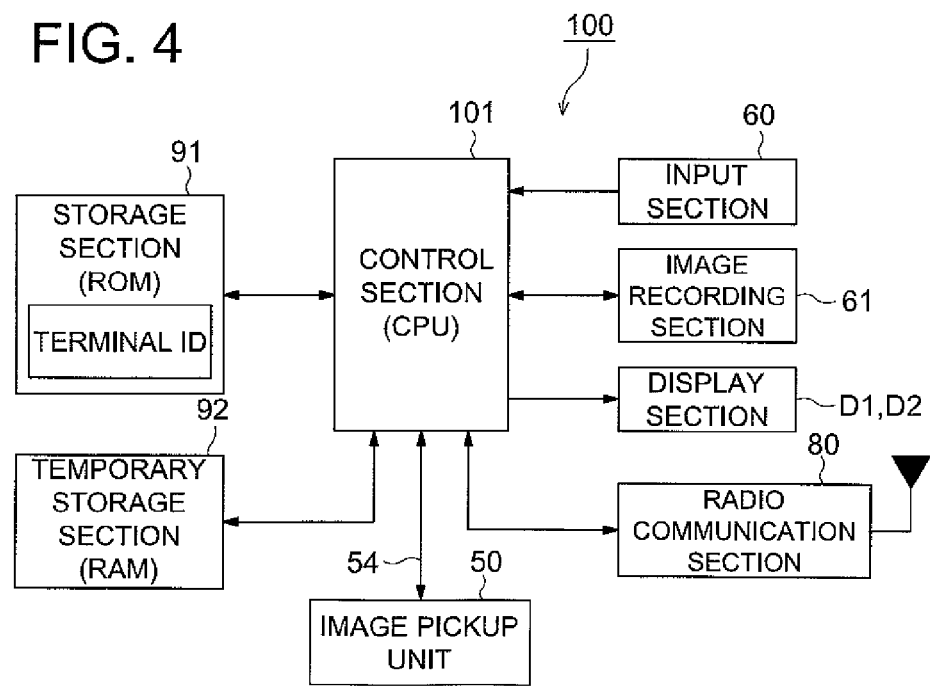
FIG. 4 shows a control block diagram of a cell phone.

FIG. 4 is a control block diagram of cell phone 100. As shown in the figure, external connecting terminal 54 (which is illustrated by an arrow) of image pickup apparatus 50 is connected to control section 101 of cell phone 100, and image signal such as luminance signal and color difference signal is outputted to control section 101.

On the one hand, cell phone 100 is provided with: control section (CPU) 101 which centrally controls each section and executes programs corresponding to each processing; input section 60 which is an input section for indicating and inputting the number; display screens D1 and D2 that display the predetermined data and images which are taken; image recording section 61 for recording the picked-up image; radio communication section 80 for realizing an each kind of information communication to the external server; storage section (ROM) 91 which stores system programs of the cell phone 100, various processing programs, and necessary data such as terminal ID; and temporary storage section (RAM) 92 which temporarily stores various processing programs and data to be processed by control section 101, processed data, image data from the image pickup apparatus 50 and is used as a working area.

Image signal inputted from image pickup apparatus 50 is displayed on display screens D1 and D2 and is transmitted to the outside as image information through radio communication section 80, by the control section 101 of cell phone 100.

EXAMPLES

Examples of the image pickup lens applied to the above embodiment will be shown below. Symbols used in each example are as follows.

f: Focal length of the total system of the image pickup lens
fB: Back focus
F: F number 2Y: Diagonal length of an image pickup surface of the solid-state image pickup element (a diagonal length of a rectangular effective pixel area of the solid-state image pickup element)

ENTP: Position of an entrance pupil (distance from the first surface to the entrance pupil)

EXTP: Position of an exit pupil (distance from the image pickup surface to the exit pupil)

H1: Position of a front principal point (distance from the first surface to the position of the front principal point)

H2: Position of a rear principal point (distance from the end surface to the position of the rear principal point)

R: Curvature radius

D: Surface distance along the axis

Nd: Refractive index of a lens material at d-line vd: Abbe number of a lens material In each Example, the shape of the aspheric surface is expressed by the following (Math. 1), where the top of the surface is defined as the origin, X-axis extends along the optical axis direction, and h represents the height perpendicular to the optical axis.

$$X = \frac{h^2/R}{1 + \sqrt{1 - (1+K)h^2/R^2}} + \sum A_i h^i \qquad [\text{Math. 1}]$$

In the expression, $A_i$ is i-th order of aspheric surface coefficient, R is a curvature radius, and K is a conic constant.

Example 1

Figure 5:
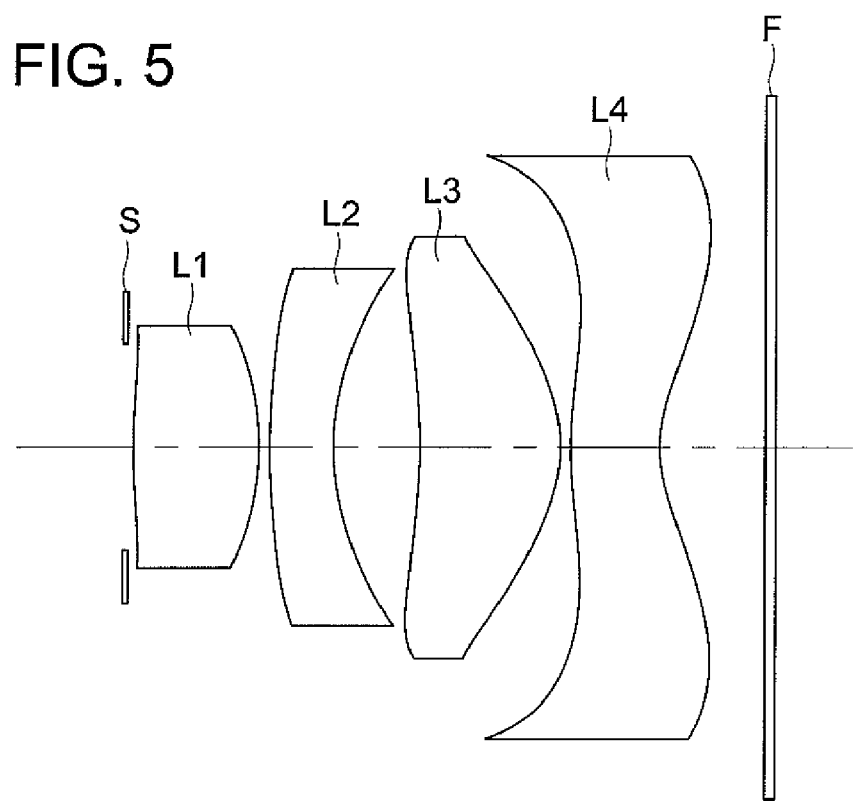
FIG. 5 shows a sectional view taken along the optical axis of the image pickup apparatus including the image pickup lens of Example 1.

FIG. 5 shows a sectional view of the image pickup lens of Example 1. In the figure, S represents an aperture stop, L1 represents the first lens, L2 represents the second lens, L3 represents the third lens, and L4 represents the fourth lens. Further, F represents a parallel flat plate provided on the assumption of an optical low-pass filter, an infrared blocking filter, and a sealing glass of a solid-state image pickup element. Paraxial data, aspheric surface coefficient data, and single lens data are shown in the following Paraxial data 1, Aspheric surface coefficient data 1, and Single lens data 1. In this example, the followings are obtained: f=4.8 mm, fB=0.72 mm, F=2.47, 2Y=7.14 mm, ENTP=0 mm, EXTP=−4.13 mm, H1=−0.05 mm, and H2=−4.08 mm.

| Paraxial data 1 | | | | | |
|---|---|---|---|---|---|
| Surface No. | R (mm) | D (mm) | Nd | vd | Effective radius (mm) |
| 1 (Stop) | ∞ | 0.10 | | | 0.97 |
| 2* | 6.709 | 1.18 | 1.58913 | 61.3 | 1.04 |
| 3* | −2.720 | 0.10 | | | 1.36 |
| 4* | 5.918 | 0.60 | 1.80543 | 26.1 | 1.54 |
| 5* | 2.209 | 0.82 | | | 1.55 |
| 6* | −5.092 | 1.33 | 1.53175 | 56.0 | 1.84 |
| 7* | −1.406 | 0.10 | | | 2.06 |
| 8* | 4.022 | 0.84 | 1.53175 | 56.0 | 2.45 |
| 9* | 1.233 | 1.00 | | | 3.13 |
| 10 | ∞ | 0.10 | 1.51630 | 64.1 | 3.48 |
| 11 | ∞ | 0.72 | | | 3.50 |

-continued

Aspheric surface coefficient data 1

$2^{nd}$ surface

K = 4.55767E+00, A4 = −2.60880E−02, A6 = −4.84268E−03,
A8 = −4.29967E−03, A10 = 1.06720E−03

$3^{rd}$ surface

K = 1.00060E+00, A4 = −9.88110E−05, A6 = 4.46523E−03,
A8 = −3.09313E−03, A10 = 4.81011E−04

$4^{th}$ surface

K = −1.40836E+00, A4 = −2.97755E−02, A6 = 1.45993E−02,
A8 = −1.77521E−03, A10 = 7.82900E−06

$5^{th}$ surface

K = −3.01554E+00, A4 = −9.65458E−03, A6 = 6.11979E−03,
A8 = 4.32172E−04, A10 = −2.19381E−04

$6^{th}$ surface

K = −3.02381E+00, A4 = 3.19368E−02, A6 = −1.12073E−02,
A8 = 2.04566E−03, A10 = −7.52000E−07

$7^{th}$ surface

K = −3.81636E+00, A4 = −2.19406E−02, A6 = 4.27939E−03,
A8 = −4.96682E−04, A10 = −1.93360E−05, A12 = 2.44840E−05

$8^{th}$ surface

K = −2.90692E+00, A4 = −4.59317E−02, A6 = 6.02061E−03,
A8 = −7.49311E−04, A10 = 9.90910E−05, A12 = −8.21100E−06

$9^{th}$ surface

K = −4.79783E+00, A4 = −2.64088E−02, A6 = 3.90884E−03,
A8 = −5.58339E−04, A10 = 4.73730E−05, A12 = −1.93000E−06

Single lens data 1

| Lens | Starting surface | Focal length (mm) |
|---|---|---|
| 1 | 2 | 3.446 |
| 2 | 4 | −4.717 |
| 3 | 6 | 3.245 |
| 4 | 8 | −3.737 |

Figure 6A:
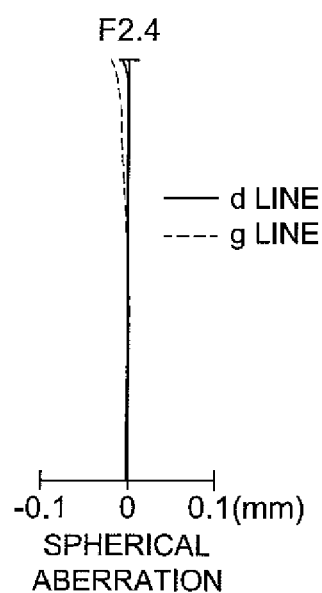
FIGS. 6a to 6c show aberration diagrams of Example 1 including spherical aberration (FIG. 6a), astigmatism (FIG. 6b), and distortion (FIG. 6c), respectively.
Figure 6B:
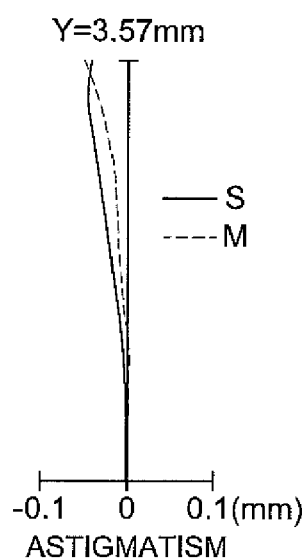
Figure 6C:
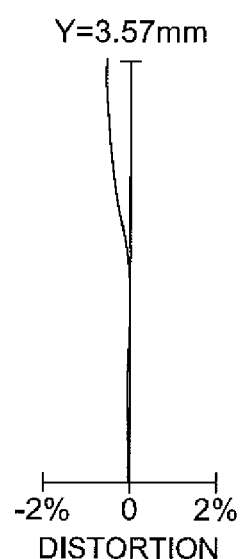

FIGS. 6a, 6b and 6c show aberration diagrams (spherical aberration, astigmatism, distortion) of the image pickup lens of Example 1. The first lens and the second lens are formed of glass and the third lens and the fourth lens are formed of a polyolefin plastic material.

Example 2

Figure 7:
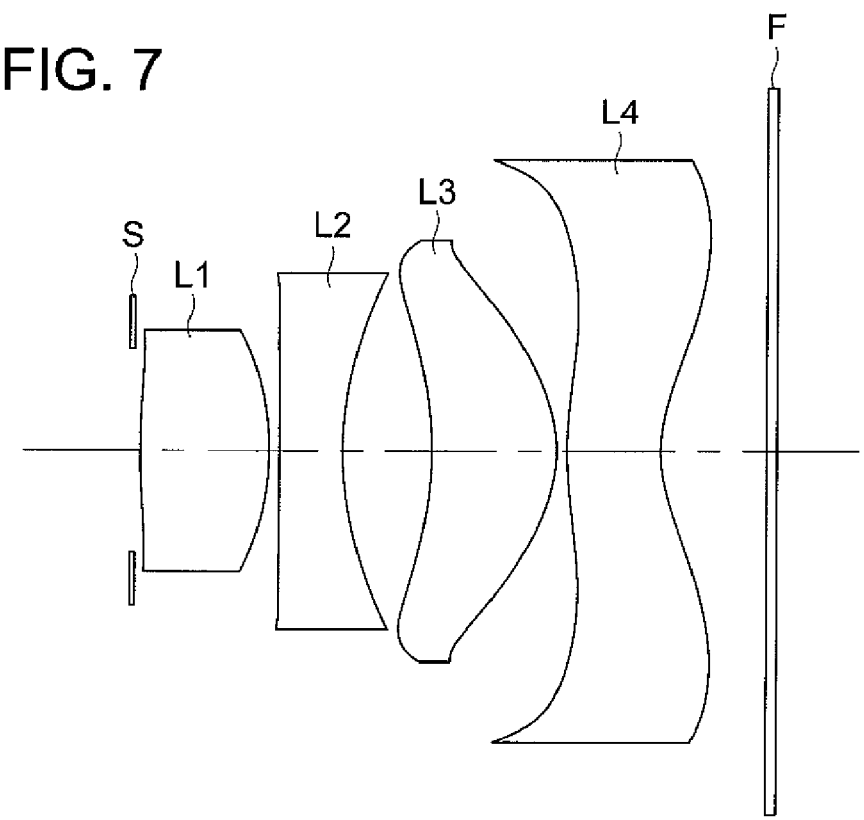
FIG. 7 shows a sectional view taken along the optical axis of the image pickup apparatus including the image pickup lens of Example 2.

FIG. 7 shows a sectional view of the image pickup lens of Example 2. In the figure, S represents an aperture stop, L1 represents the first lens, L2 represents the second lens, L3 represents the third lens, and L4 represents the fourth lens. Further, F represents a parallel flat plate provided on the assumption of an optical low-pass filter, an infrared blocking filter, and a sealing glass of a solid-state image pickup element. Paraxial data, aspheric surface coefficient data, and single lens data are shown in the following Paraxial data 2, Aspheric surface coefficient data 2, and Single lens data 2. In this expression, the followings are obtained: f=4.78 mm, fB=0.77 mm, F=2.88, 2Y=7.14 mm, ENTP=0 mm, EXTP=−4.17 min, H1=−0.16 mm, and H2=−4.01 mm.

Paraxial data 2

| Surface No. | R (mm) | D (mm) | Nd | vd | Effective radius (mm) |
|---|---|---|---|---|---|
| 1 (Stop) | ∞ | 0.10 | | | 0.82 |
| 2* | 6.808 | 1.22 | 1.69350 | 53.2 | 0.89 |
| 3* | −2.661 | 0.10 | | | 1.22 |
| 4* | 69.793 | 0.60 | 1.80542 | 26.1 | 1.30 |
| 5* | 2.975 | 0.85 | | | 1.40 |
| 6* | −3.255 | 1.19 | 1.53175 | 56.0 | 1.62 |
| 7* | −1.324 | 0.10 | | | 1.89 |
| 8* | 3.849 | 0.88 | 1.53175 | 56.0 | 2.45 |
| 9* | 1.269 | 1.00 | | | 3.12 |
| 10 | ∞ | 0.10 | 1.51630 | 64.1 | 3.45 |
| 11 | ∞ | 0.77 | | | 3.48 |

Aspheric surface coefficient data 2

$2^{nd}$ surface

K = 3.75899E+00, A4 = −2.66961E−02, A6 = −3.66287E−03,
A8 = −9.78487E−03, A10 = 3.82192E−03

$3^{rd}$ surface

K = 1.32136E+00, A4 = −3.08553E−03, A6 = 6.71917E−03,
A8 = −2.67124E−03, A10 = −3.04790E−05

$4^{th}$ surface

K = 2.00000E+01, A4 = −2.77099E−02, A6 = 1.67558E−02,
A8 = −1.64903E−03, A10 = −5.32669E−04

$5^{th}$ surface

K = −3.28732E+00, A4 = −1.05208E−02, A6 = 5.89783E−03,
A8 = 5.27868E−04, A10 = −3.71589E−04

$6^{th}$ surface

K = −7.54816E−01, A4 = 2.98690E−02, A6 = −1.46051E−02,
A8 = 2.39350E−03, A10 = 3.55264E−04

$7^{th}$ surface

K = −3.12043E+00, A4 = −2.76708E−02, A6 = 2.77646E−03,
A8 = −6.33587E−04, A10 = 8.10430E−05, A12 = 5.42640E−05

$8^{th}$ surface

K = −1.74948E+00, A4 = −4.83428E−02, A6 = 5.99966E−03,
A8 = −6.02361E−04, A10 = 1.04196E−04, A12 = −1.07320E−05

$9^{th}$ surface

K = −4.78280E+00, A4 = −2.83562E−02, A6 = 4.85224E−03,
A8 = −7.70495E−04, A10 = 7.18190E−05, A12 = −2.97400E−06

Single lens data 2

| Lens | Starting surface | Focal length (mm) |
|---|---|---|
| 1 | 2 | 2.913 |
| 2 | 4 | −3.874 |
| 3 | 6 | 3.460 |
| 4 | 8 | −4.039 |

Figure 8A:
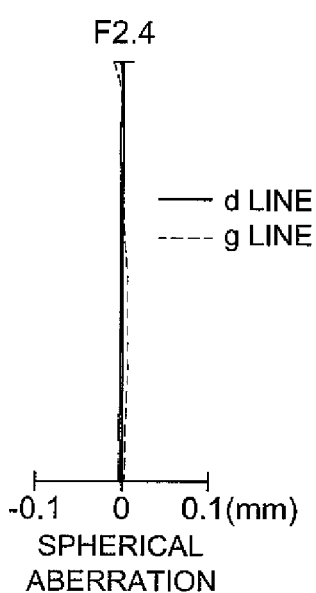
FIGS. 8a to 8c show aberration diagrams of Example 2 including spherical aberration (FIG. 8a), astigmatism (FIG. 8b), and distortion (FIG. 8c), respectively.
Figure 8B:
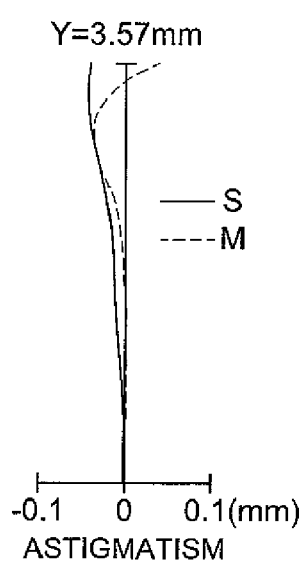
Figure 8C:
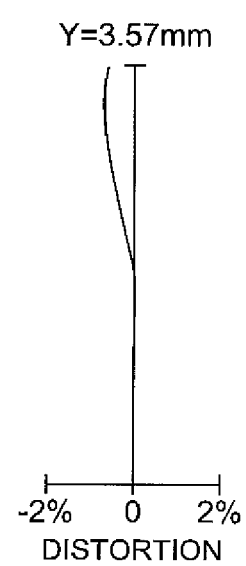

FIGS. 8a, 8b and 8c show aberration diagrams (spherical aberration, astigmatism, distortion) of the image pickup lens of Example 2. The first lens and the second lens are formed of glass and the third lens and the fourth lens are formed of a polyolefin plastic material.

Example 3

FIG. 9 shows a sectional view of the image pickup lens of Example 3. In the figure, S represents an aperture stop, L1 represents the first lens, L2 represents the second lens, L3 represents the third lens, and L4 represents the fourth lens. Further, F represents a parallel flat plate provided on the assumption of an optical low-pass filter, an infrared blocking filter, and a sealing glass of a solid-state image pickup element. Paraxial data, aspheric surface coefficient data, and single lens data are shown in the following Paraxial data 3, Aspheric surface coefficient data 3, and Single lens data 3. In this expression, the followings are obtained: f=4.76 mm, fB=0.8 mm, F=2.47, 2Y=7.14 mm, ENTP=0 mm, EXTP=−4.35 mm, H1=−0.36 mm, and H2=−3.96 mm.

Paraxial data 3

| Surface No. | R (mm) | D (mm) | Nd | νd | Effective radius (mm) |
|---|---|---|---|---|---|
| 1 (Stop) | ∞ | 0.05 | | | 0.96 |
| 2* | 9.679 | 1.21 | 1.68980 | 52.8 | 0.97 |
| 3* | −2.675 | 0.10 | | | 1.31 |
| 4* | 8.547 | 0.55 | 1.83310 | 24.0 | 1.45 |
| 5* | 2.572 | 1.00 | | | 1.49 |
| 6* | −2.862 | 1.18 | 1.53175 | 56.0 | 1.69 |
| 7* | −1.365 | 0.10 | | | 1.98 |
| 8* | 2.866 | 0.83 | 1.53175 | 56.0 | 2.65 |
| 9* | 1.209 | 1.00 | | | 3.22 |
| 10 | ∞ | 1.00 | 1.51630 | 64.1 | 3.48 |
| 11 | ∞ | 0.80 | | | 3.50 |

Aspheric surface coefficient data 3

$2^{nd}$ surface

K = −1.60232E+01, A4 = −2.58667E−02, A6 = −6.27441E−03, A8 = −3.79239E−03, A10 = −1.51020E−05

$3^{rd}$ surface

K = 1.31541E+00, A4 = −3.83529E−03, A6 = 3.85890E−03, A8 = −1.36533E−03, A10 = −9.58800E−06

$4^{th}$ surface

K = 8.28411E+00, A4 = −2.78721E−02, A6 = 1.22904E−02, A8 = −1.30477E−03, A10 = −1.57530E−04

$5^{th}$ surface

K = −2.78259E+00, A4 = −1.00014E−02, A6 = 5.88976E−03, A8 = −7.58000E−07, A10 = −2.33271E−04

$6^{th}$ surface

K = −1.03137E+00, A4 = 3.12410E−02, A6 = −1.39736E−02, A8 = 3.37748E−03, A10 = −1.67508E−04

$7^{th}$ surface

K = −3.00934E+00, A4 = −2.34895E−02, A6 = 1.91668E−03, A8 = 1.23258E−04, A10 = −1.13478E−04, A12 = 3.68660E−05

$8^{th}$ surface

K = −6.11849E+00, A4 = −3.19619E−02, A6 = 5.89726E−03, A8 = −9.75743E−04, A10 = 1.13100E−04, A12 = −6.27400E−06

$9^{th}$ surface

K = −4.34065E+00, A4 = −2.50101E−02, A6 = 4.52276E−03, A8 = −6.89189E−04, A10 = 5.70430E−05, A12 = −2.04600E−06

Single lens data 3

| Lens | Starting surface | Focal length (mm) |
|---|---|---|
| 1 | 2 | 3.165 |
| 2 | 4 | −4.611 |
| 3 | 6 | 3.856 |
| 4 | 8 | −4.761 |

FIGS. 10a, 10b and 10c show aberration diagrams (spherical aberration, astigmatism, distortion) of the image pickup lens of Example 3. The first lens and the second lens are formed of glass and the third lens and the fourth lens are formed of a polyolefin plastic material.

Example 4

Figure 11:
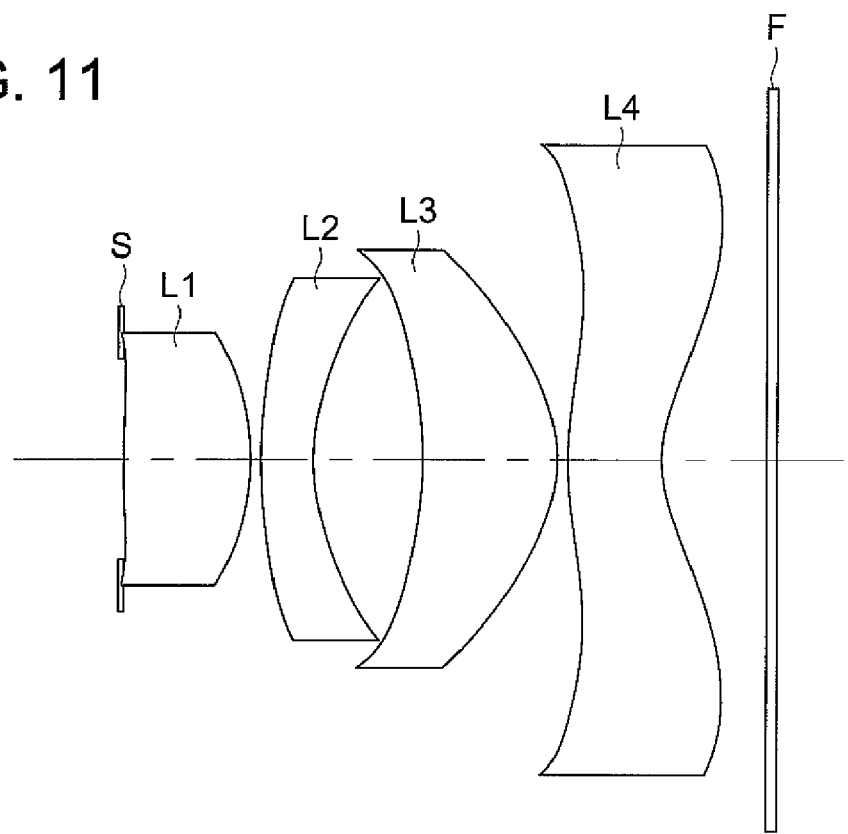
FIG. 11 shows a sectional view taken along the optical axis of the image pickup apparatus including the image pickup lens of Example 4.

FIG. 11 shows a sectional view of the image pickup lens of Example 4. In the figure, S represents an aperture stop, L1 represents the first lens, L2 represents the second lens, L3 represents the third lens, and L4 represents the fourth lens. Further, F represents a parallel flat plate provided on the assumption of an optical low-pass filter, an infrared blocking filter, and a sealing glass of a solid-state image pickup element. Paraxial data, aspheric surface coefficient data, and single lens data are shown in the following Paraxial data 4, Aspheric surface coefficient data 4, and Single lens data 4. In this expression, the followings are obtained: f=4.74 mm, fB=0.63 mm, F=2.47, 2Y=7.14 mm, ENTP=0 mm, EXTP=−4.3 mm, H1=−0.19 mm, and H2=−4.1 mm.

Paraxial data 4

| Surface No. | R (mm) | D (mm) | Nd | νd | Effective radius (mm) |
|---|---|---|---|---|---|
| 1 (Stop) | ∞ | 0.05 | | | 0.95 |
| 2* | 9.968 | 1.20 | 1.58910 | 61.3 | 0.96 |
| 3* | −2.407 | 0.10 | | | 1.32 |
| 4* | 4.290 | 0.50 | 1.83310 | 24.0 | 1.54 |
| 5* | 2.037 | 1.04 | | | 1.52 |
| 6* | −3.586 | 1.29 | 1.53175 | 56.0 | 1.70 |
| 7* | −1.391 | 0.10 | | | 2.05 |
| 8* | 3.542 | 0.89 | 1.53175 | 56.0 | 2.73 |
| 9* | 1.224 | 1.00 | | | 3.31 |
| 10 | ∞ | 0.10 | 1.51630 | 64.1 | 3.53 |
| 11 | ∞ | 0.63 | | | 3.55 |

Aspheric surface coefficient data 4

$2^{nd}$ surface

K = −1.99996E+01, A4 = −2.73576E−02, A6 = −5.85376E−03, A8 = −5.69809E−03, A10 = 1.40914E−03

$3^{rd}$ surface

K = 8.94189E−01, A4 = 3.35912E−04, A6 = 4.92997E−03, A8 = −2.22157E−03, A10 = 4.39993E−04

$4^{th}$ surface

K = −5.65474E+00, A4 = −3.23668E−02, A6 = 1.53147E−02, A8 = −1.01472E−03, A10 = −1.23208E−04

$5^{th}$ surface

K = −3.39895E+00, A4 = −1.10230E−02, A6 = 6.02376E−03, A8 = 3.53249E−04, A10 = −8.94710E−05

$6^{th}$ surface

K = −9.66898E−01, A4 = 2.92377E−02, A6 = −1.15388E−02, A8 = 2.16238E−03, A10 = −3.45669E−04

$7^{th}$ surface

K = −3.35097E+00, A4 = −2.29811E−02, A6 = 3.34138E−03, A8 = −3.42837E−04, A10 = −7.71010E−05, A12 = 1.53760E−05

$8^{th}$ surface

K = −3.46863E+00, A4 = −3.94713E−02, A6 = 6.57952E−03, A8 = −9.97574E−04, A10 = 1.14879E−04, A12 = −5.72300E−06

$9^{th}$ surface

K = −4.41463E+00, A4 = −2.28250E−02, A6 = 3.78798E−03, A8 = −5.63350E−04, A10 = 4.57170E−05, A12 = −1.51400E−06

Single lens data 4

| Lens | Starting surface | Focal length (mm) |
|---|---|---|
| 1 | 2 | 3.414 |
| 2 | 4 | −5.178 |
| 3 | 6 | 3.549 |
| 4 | 8 | −4.059 |

Figure 12A:
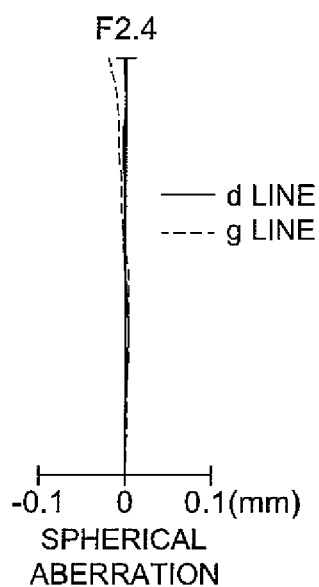
FIGS. 12a to 12c show aberration diagrams of Example 4 including spherical aberration (FIG. 12a), astigmatism (FIG. 12b), and distortion (FIG. 12c), respectively.
Figure 12B:
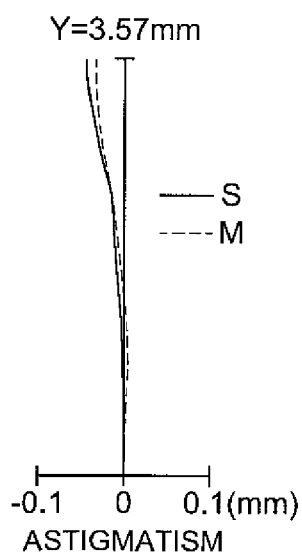
Figure 12C:
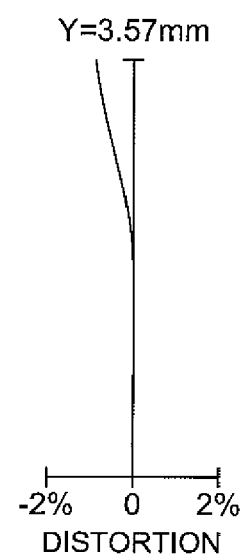

FIGS. 12a, 12b and 12c show aberration diagrams (spherical aberration, astigmatism, distortion) of the image pickup lens of Example 4. The first lens and the second lens are formed of glass and the third lens and the fourth lens are formed of a polyolefin plastic material.

Example 5

Figure 13:
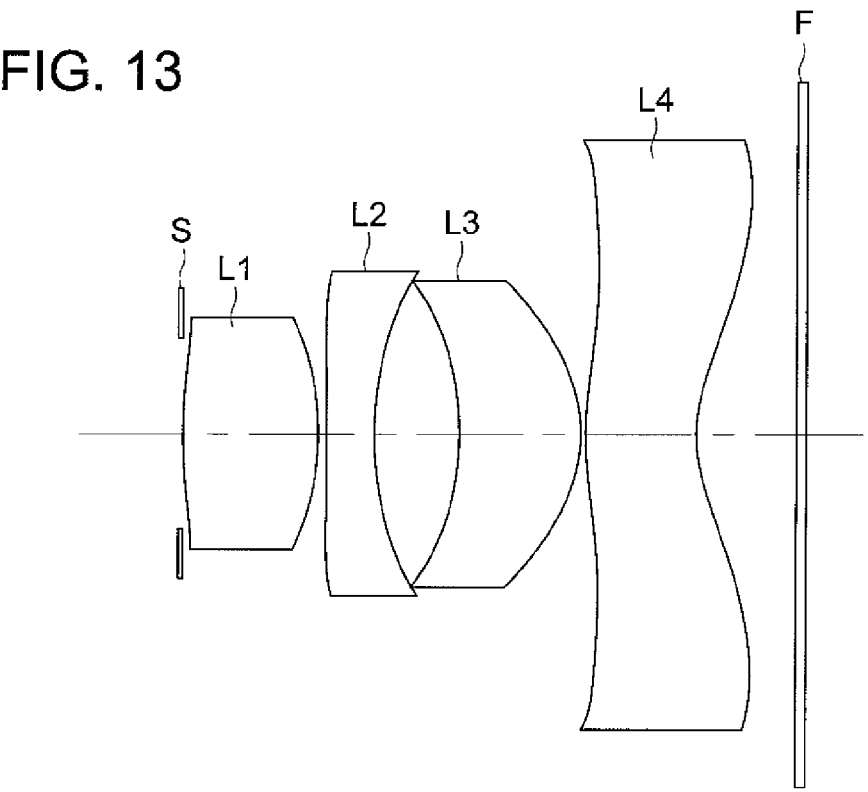
FIG. 13 shows a sectional view taken along the optical axis of the image pickup apparatus including the image pickup lens of Example 5.

FIG. 13 shows a sectional view of the image pickup lens of Example 5. In the figure, S represents an aperture stop, L1 represents the first lens, L2 represents the second lens, L3 represents the third lens, and L4 represents the fourth lens. Further, F represents a parallel flat plate provided on the assumption of an optical low-pass filter, an infrared blocking filter, and a sealing glass of a solid-state image pickup element. Paraxial data, aspheric surface coefficient data, and single lens data are shown in the following Paraxial Path 5, Aspheric surface coefficient data 5, and Single lens data 5. In this expression, the followings are obtained: f=4.76 mm, fB=0.59 mm, F=2.47, 2Y=7.14 mm, ENTP=0 mm, EXTP=−4.17 mm, H1=−0.01 mm, and H2=4.16 mm.

| Paraxial data 5 | | | | | |
|---|---|---|---|---|---|
| Surface No. | R (mm) | D (mm) | Nd | vd | Effective radius (mm) |
| 1 (Stop) | ∞ | 0.05 | | | 0.96 |
| 2* | 5.194 | 1.36 | 1.69350 | 53.2 | 1.01 |
| 3* | −2.879 | 0.08 | | | 1.34 |
| 4* | 217.350 | 0.48 | 1.80518 | 25.4 | 1.41 |
| 5* | 3.208 | 0.86 | | | 1.44 |
| 6* | −2.757 | 1.22 | 1.53175 | 56.0 | 1.50 |
| 7* | −1.492 | 0.05 | | | 1.91 |
| 8* | 3.542 | 1.10 | 1.53175 | 56.0 | 2.71 |
| 9* | 1.418 | 1.00 | | | 3.32 |
| 10 | ∞ | 0.10 | 1.51630 | 64.1 | 3.53 |
| 11 | ∞ | 0.60 | | | 3.55 |

Aspheric surface coefficient data 5

$2^{nd}$ surface

K = −5.35382E+00, A4 = −1.41346E−02, A6 = −4.70483E−03,
A8 = −3.90833E−03, A10 = 5.47657E−04

$3^{rd}$ surface

K = 1.18247E+00, A4 = 5.28755E−04, A6 = 6.94128E−04,
A8 = −8.81405E−04, A10 = 1.00880E−05

$4^{th}$ surface

K = 2.00000E+01, A4 = −1.61414E−02, A6 = 1.01202E−02,
A8 = −2.72520E−04, A10 = −1.51000E−04

$5^{th}$ surface

K = −2.64432E+00, A4 = −6.36371E−03, A6 = 7.19814E−03,
A8 = −1.00402E−03, A10 = 1.60688E−04

$6^{th}$ surface

K = 5.23350E−01, A4 = 2.80399E−02, A6 = −2.15421E−02,
A8 = 7.52234E−03, A10 = −1.26765E−03

$7^{th}$ surface

K = −1.55942E+00, A4 = −4.15677E−03, A6 = −2.53439E−03,
A8 = 4.13430E−05, A10 = −9.95910E−05,
A12 = 4.85140E−05

$8^{th}$ surface

K = −1.58949E+01, A4 = −3.13455E−02, A6 = 7.71821E−03,
A8 = −1.19952E−03, A10 = 1.15066E−04, A12 = −4.99900E−06

$9^{th}$ surface

K = −4.63267E+00, A4 = −2.50502E−02, A6 = 4.82416E−03,
A8 = −6.46363E−04, A10 = 4.56850E−05, A12 = −1.35400E−06

| Single lens data 5 | | |
|---|---|---|
| Lens | Starting surface | Focal length (mm) |
| 1 | 2 | 2.869 |
| 2 | 4 | −4.048 |
| 3 | 6 | 4.581 |
| 4 | 8 | −5.423 |

Figures 14A, 14B, 14C:
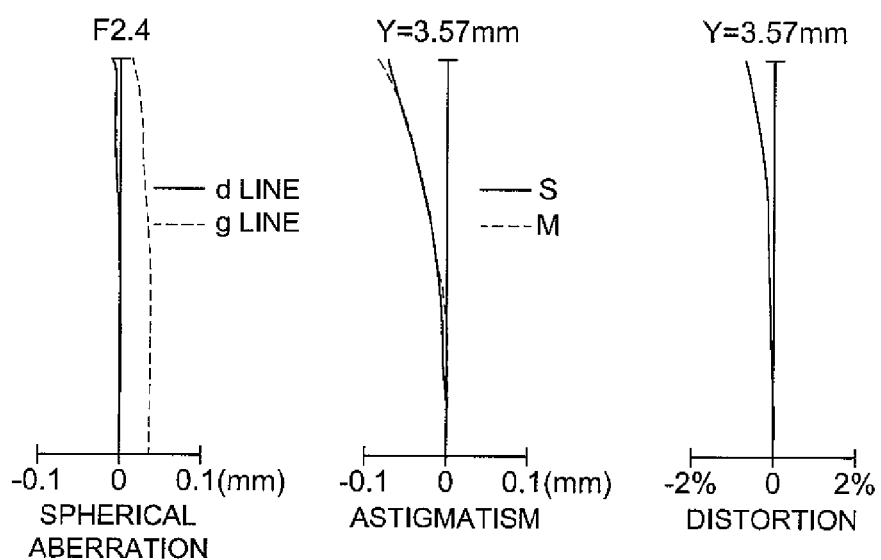
FIGS. 14a to 14c show aberration diagrams of Example 5 including spherical aberration (FIG. 14a), astigmatism (FIG. 14b), and distortion (FIG. 14c), respectively.

FIGS. 14a, 14b and 14c show aberration diagrams (spherical aberration, astigmatism, distortion) of the image pickup lens of Example 5. The first lens and the second lens are formed of glass and the third lens and the fourth lens are formed of a polyolefin plastic material.

Example 6

Figure 15:
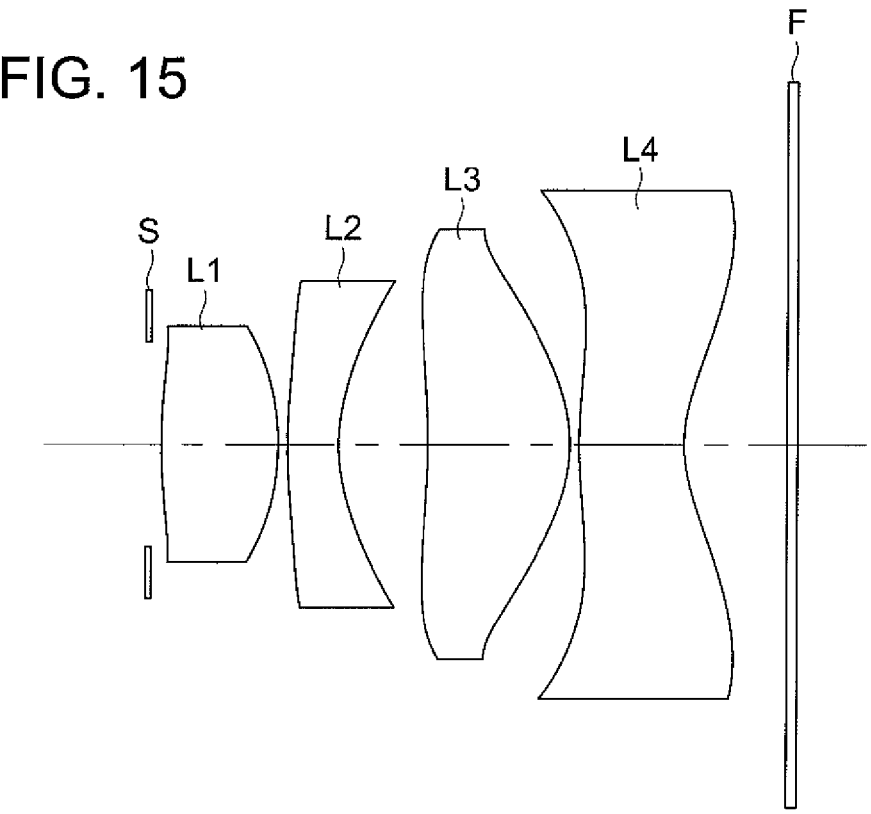
FIG. 15 shows a sectional view taken along the optical axis of the image pickup apparatus including the image pickup lens of Example 6.

FIG. 15 shows a sectional view of the image pickup lens of Example 6. In the figure, S represents an aperture stop, L1 represents the first lens, L2 represents the second lens, L3 represents the third lens, and L4 represents the fourth lens. Further, F represents a parallel flat plate provided on the assumption of an optical low-pass filter, an infrared blocking filter, and a sealing glass of a solid-state image pickup element. Paraxial data, aspheric surface coefficient data, and single lens data are shown in the following Paraxial data 6, Aspheric surface coefficient data 6, and Single lens data 6. In this expression, the followings are obtained: f=4.91 mm, fB=0.65 mm, F=2.47, 2Y=7.14 mm, ENTP=0 mm, EXTP=−4.14 mm, H1=−0.12 mm, and H2=−4.25 mm.

| Paraxial data 6 | | | | | |
|---|---|---|---|---|---|
| Surface No. | R (mm) | D (mm) | Nd | vd | Effective radius (mm) |
| 1 (Stop) | ∞ | 0.15 | | | 0.98 |
| 2* | 5.024 | 1.13 | 1.48749 | 70.2 | 1.11 |
| 3* | −2.429 | 0.09 | | | 1.38 |
| 4* | 4.877 | 0.50 | 1.61340 | 44.3 | 1.56 |
| 5* | 1.779 | 0.87 | | | 1.64 |
| 6* | −6.155 | 1.37 | 1.53175 | 56.0 | 2.10 |
| 7* | −1.520 | 0.09 | | | 2.16 |
| 8* | 5.094 | 1.02 | 1.53175 | 56.0 | 2.45 |
| 9* | 1.352 | 1.00 | | | 3.23 |
| 10 | ∞ | 0.10 | 1.51630 | 64.1 | 3.52 |
| 11 | ∞ | 0.65 | | | 3.54 |

Aspheric surface coefficient data 6

$2^{nd}$ surface

K = 1.93593E+00, A4 = −2.60580E−02, A6 = −9.68466E−03,
A8 = −9.52415E−04, A10 = −2.00758E−03

$3^{rd}$ surface

K = 1.18034E+00, A4 = 5.29555E−03, A6 = 3.06046E−03,
A8 = −2.34041E−03, A10 = 1.56837E−04

$4^{th}$ surface

K = −2.00000E+01, A4 = −4.14964E−02, A6 = 1.62918E−02,
A8 = −1.24687E−03, A10 = −1.17536E−04

$5^{th}$ surface

K = −3.47888E+00, A4 = −9.91862E−03, A6 = 6.03017E−03,
A8 = 7.20580E−05, A10 = −1.78463E−04

$6^{th}$ surface

K = −7.45472E+00, A4 = 3.29123E−02, A6 = −9.01053E−03,
A8 = 2.01732E−03, A10 = −1.31554E−04

$7^{th}$ surface

K = −3.57546E+00, A4 = −1.88601E−02, A6 = 4.33752E−03,
A8 = −3.80074E−04, A10 = 1.34680E−05, A12 = 1.71090E−05

-continued

8th surface

K = 6.22879E−01, A4 = −4.94008E−02, A6 = 6.13819E−03,
A8 = −7.49483E−04, A10 = 8.10750E−05, A12 = −4.86900E−06

9th surface

K = −4.79668E+00, A4 = −2.51886E−02, A6 = 3.96910E−03,
A8 = −5.76680E−04, A10 = 4.67340E−05, A12 = −1.65500E−06

Single lens data 6

| Lens | Starting surface | Focal length (mm) |
|---|---|---|
| 1 | 2 | 3.523 |
| 2 | 4 | −4.837 |
| 3 | 6 | 3.444 |
| 4 | 8 | −3.822 |

Figure 16A:
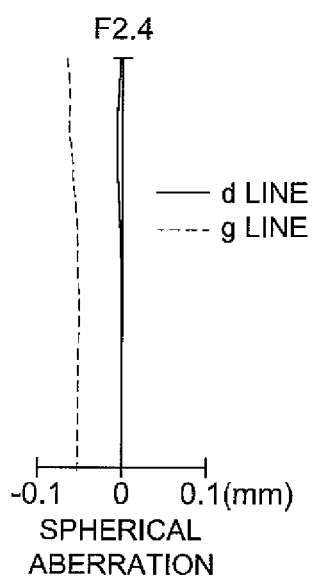
FIGS. 16a to 16c show aberration diagrams of Example 6 including spherical aberration (FIG. 16a), astigmatism (FIG. 16b), and distortion (FIG. 16c), respectively.
Figure 16B:
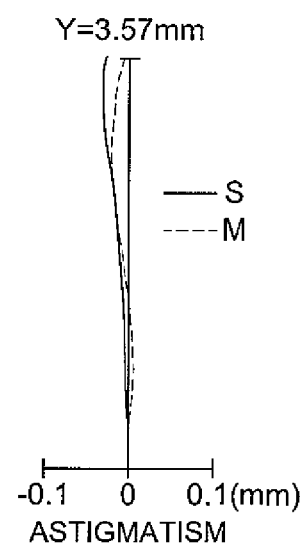
Figure 16C:
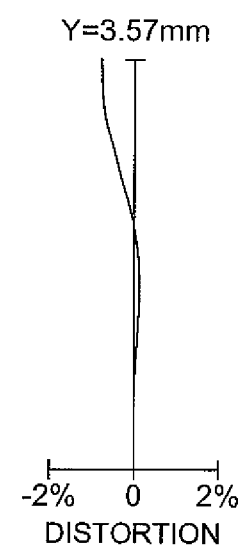

FIGS. 16a, 16b and 16c show aberration diagrams (spherical aberration, astigmatism, distortion) of the image pickup lens of Example 6. The first lens and the second lens are formed of glass and the third lens and the fourth lens are formed of a polyolefin plastic material.

Example 7

Figure 17:
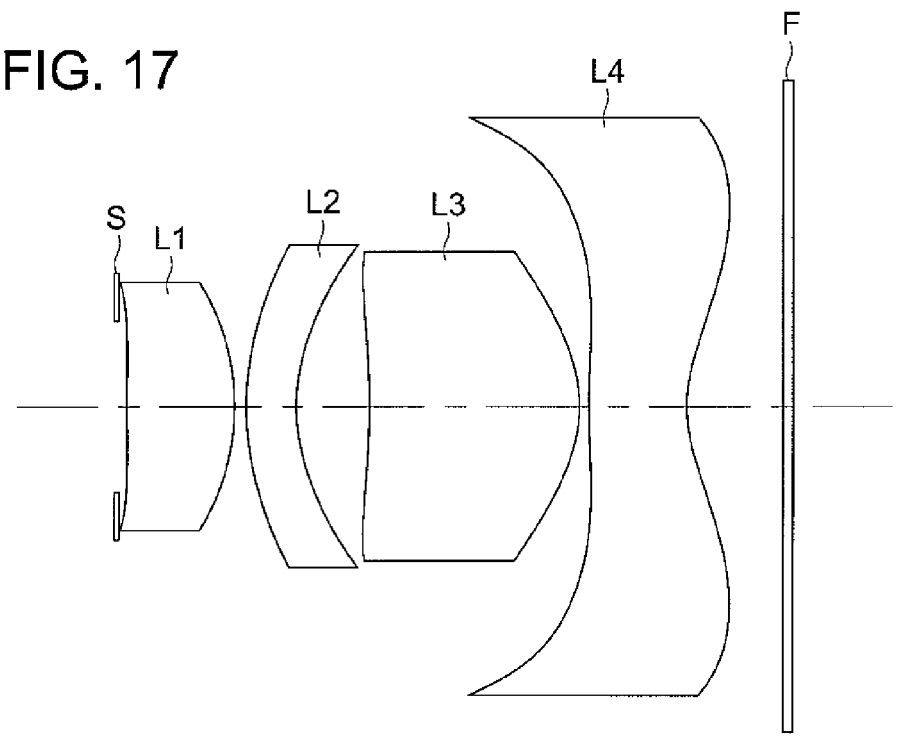
FIG. 17 shows a sectional view taken along the optical axis of the image pickup apparatus including the image pickup lens of Example 7.

FIG. 17 shows a sectional view of the image pickup lens of Example 7. In the figure, S represents an aperture stop, L1 represents the first lens, L2 represents the second lens, L3 represents the third lens, and L4 represents the fourth lens. Further, F represents a parallel flat plate provided on the assumption of an optical low-pass filter, an infrared blocking filter, and a sealing glass of a solid-state image pickup element Paraxial data, aspheric surface coefficient data, and single lens data are shown in the following Paraxial data 7, Aspheric surface coefficient data 7, and Single lens data 7. In this expression, the followings are obtained: f=5.65 mm, fB=1.03 mm, F=3.2, 2Y=7.14 mm, ENTP=0 mm, EXTP=−4.27 mm, H1=−0.37 mm, and H2=−4.62 mm.

Paraxial data 7

| Surface No. | R (mm) | D (mm) | Nd | vd | Effective radius (mm) |
|---|---|---|---|---|---|
| 1 (Stop) | ∞ | 0.13 | | | 0.88 |
| 2* | 31.348 | 1.11 | 1.49700 | 81.6 | 0.97 |
| 3* | −2.513 | 0.12 | | | 1.31 |
| 4* | 2.821 | 0.52 | 1.92286 | 18.9 | 1.65 |
| 5* | 1.887 | 0.76 | | | 1.60 |
| 6* | −7.997 | 2.18 | 1.49200 | 58.0 | 1.74 |
| 7* | −1.463 | 0.10 | | | 2.14 |
| 8* | 8.202 | 1.01 | 1.57100 | 34.0 | 2.40 |
| 9* | 1.431 | 1.00 | | | 3.14 |
| 10 | ∞ | 0.10 | 1.51630 | 64.1 | 3.39 |
| 11 | ∞ | 1.04 | | | 3.41 |

Aspheric surface coefficient data 7

2nd surface

K = 3.60586E+00, A4 = −2.39420E−02, A6 = −9.08604E−03,
A8 = 4.94773E−03, A10 = −2.42591E−03

3rd surface

K = 7.96499E−01, A4 = 3.44276E−03, A6 = 4.91423E−03,
A8 = −7.35909E−04, A10 = −3.91625E−04

4th surface

K = −1.16292E+00, A4 = −2.66997E−02, A6 = 1.33778E−02,
A8 = −2.16304E−03, A10 = 1.17880E−05

-continued

5th surface

K = −2.74175E+00, A4 = −8.69543E−03, A6 = 7.61202E−03,
A8 = 3.65857E−04, A10 = −4.16583E−04

6th surface

K = 1.34604E+01, A4 = 1.74964E−02, A6 = −3.60240E−03,
A8 = 2.58496E−03, A10 = −2.16375E−04

7th surface

K = −3.30935E+00, A4 = −2.34160E−02, A6 = 5.24974E−03,
A8 = −3.93672E−04, A10 = 1.52040E−05,
A12 = 8.51100E−06

8th surface

K = 6.21112E+00, A4 = −4.81274E−02, A6 = 8.12398E−03,
A8 = −9.36988E−04, A10 = 5.22090E−05, A12 = −2.09900E−06

9th surface

K = −5.04126E+00, A4 = −2.65176E−02, A6 = 4.30754E−03,
A8 = −5.63264E−04, A10 = 3.84430E−05, A12 = −1.16100E−06

Single lens data 7

| Lens | Starting surface | Focal length (mm) |
|---|---|---|
| 1 | 2 | 4.718 |
| 2 | 4 | −8.328 |
| 3 | 6 | 3.279 |
| 4 | 8 | −3.210 |

Figure 18A:
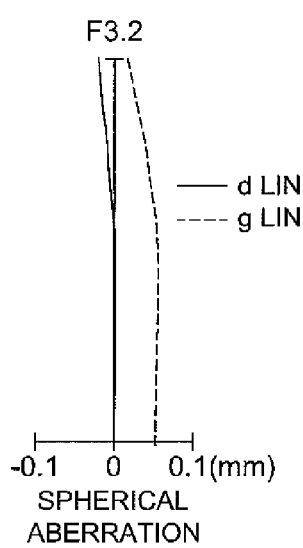
FIGS. 18a to 18c show aberration diagrams of Example 7 including spherical aberration (FIG. 18a), astigmatism (FIG. 18b), and distortion (FIG. 18c), respectively.
Figure 18B:
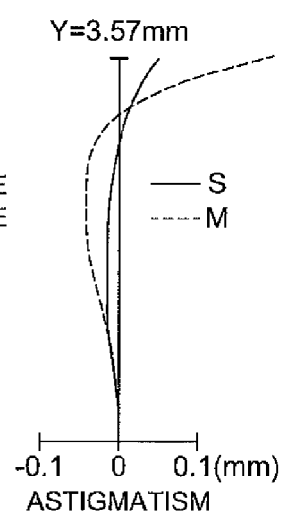
Figure 18C:
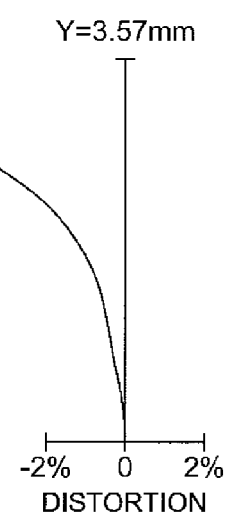

FIGS. 18a, 18b and 18c show aberration diagrams (spherical aberration, astigmatism, distortion) of the image pickup lens of Example 7. The first lens and the second lens are formed of glass and the third lens and the fourth lens are formed of plastic materials.

Example 8

Figure 19:
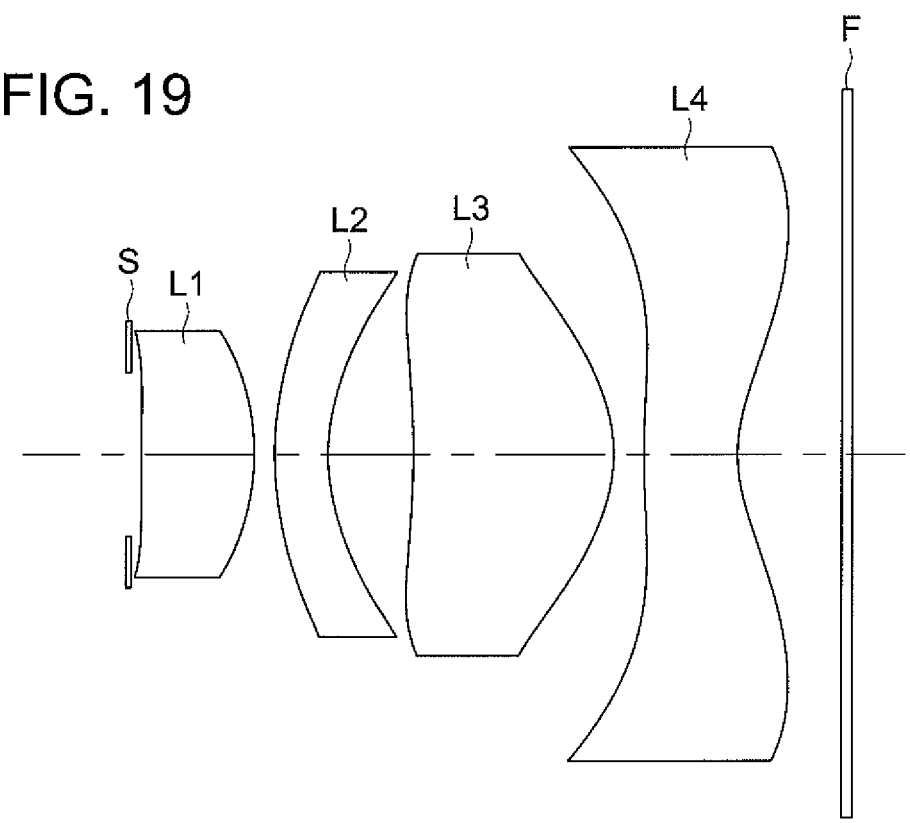
FIG. 19 shows a sectional view taken along the optical axis of the image pickup apparatus including the image pickup lens of Example 8.

FIG. 19 shows a sectional view of the image pickup lens of Example 8. In the figure, S represents an aperture stop, L1 represents the first lens, L2 represents the second lens, L3 represents the third lens, and L4 represents the fourth lens. Further, F represents a parallel flat plate provided on the assumption of an optical low-pass filter, an infrared blocking filter, and a sealing glass of a solid-state image pickup element. Paraxial data, aspheric surface coefficient data, and single lens data are shown in the following Paraxial data 8, Aspheric surface coefficient data 8, and Single lens data 8. In this expression, the followings are obtained: f=5 mm, fB=0.5 mm, F=3.2, 2Y=7.14 mm, ENTP=0 mm, EXTP=−4.33 mm, H1=0.17 mm, and H2=−4.5 mm.

Paraxial data 8

| Surface No. | R (mm) | D (mm) | Nd | vd | Effective radius (mm) |
|---|---|---|---|---|---|
| 1 (Stop) | ∞ | 0.15 | | | 0.78 |
| 2* | 38.100 | 1.09 | 1.49700 | 81.0 | 0.88 |
| 3* | −2.325 | 0.20 | | | 1.23 |
| 4* | 3.045 | 0.52 | 1.84666 | 23.8 | 1.59 |
| 5* | 1.931 | 0.83 | | | 1.57 |
| 6* | −7.991 | 1.94 | 1.49200 | 58.0 | 1.83 |
| 7* | −1.477 | 0.29 | | | 2.14 |
| 8* | 6.908 | 0.90 | 1.57100 | 34.0 | 2.51 |
| 9* | 1.433 | 1.00 | | | 3.23 |

-continued

| 10 | ∞ | 0.10 | 1.51630 | 64.1 | 3.52 |
| 11 | ∞ | 0.50 | | | 3.55 |

Aspheric surface coefficient data 8

$2^{nd}$ surface

K = −2.00000E+01, A4 = −2.87906E−02, A6 = −1.00420E−02,
A8 = 6.12642E−03, A10 = −3.85125E−03
$3^{rd}$ surface K = 7.63658E−01, A4 = 3.65208E−03, A6 = 5.30203E−03,
A8 = −3.98550E−04, A10 = −4.29778E−04
$4^{th}$ surface K = −1.32336E+00, A4 = −2.73738E−02, A6 = 1.34013E−02,
A8 = −2.10290E−03, A10 = −1.03180E−05
$5^{th}$ surface K = −2.73406E+00, A4 = −9.17435E−03, A6 = 7.20463E−03,
A8 = 2.25528E−04, A10 = −3.82110E−04
$6^{th}$ surface K = 1.34801E+01, A4 = 1.82975E−02, A6 = −3.73206E−03,
A8 = 2.50792E−03, A10 = −2.48875E−04
$7^{th}$ surface K = −3.22893E+00, A4 = −2.46558E−02, A6 = 4.92926E−03,
A8 = −4.04466E−04, A10 = 2.46460E−05, A12 = 1.05040E−05
$8^{th}$ surface K = 3.26782E+00, A4 = −4.93107E−02, A6 = 8.12659E−03,
A8 = −9.39729E−04, A10 = 5.45200E−05, A12 = −1.20100E−06
$9^{th}$ surface K = −4.73984E+00, A4 = −2.65931E−02, A6 = 4.60075E−03,
A8 = −5.74510E−04, A10 = 3.71360E−05, A12 = −9.96000E−07

Single lens data 8

| Lens | Starting surface | Focal length (mm) |
|---|---|---|
| 1 | 2 | 4.436 |
| 2 | 4 | −7.861 |
| 3 | 6 | 3.355 |
| 4 | 8 | −3.367 |

Figure 20A:
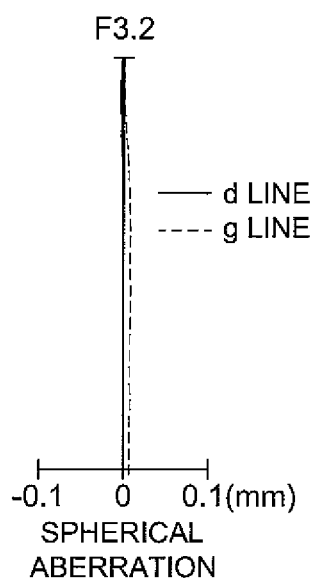
FIGS. 20a to 20c show aberration diagrams of Example 8 including spherical aberration (FIG. 20a), astigmatism (FIG. 20b), and distortion (FIG. 20c), respectively.
Figure 20B:
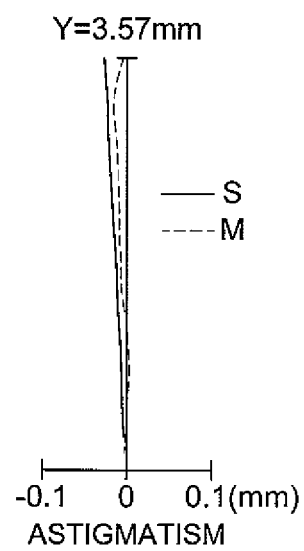
Figure 20C:
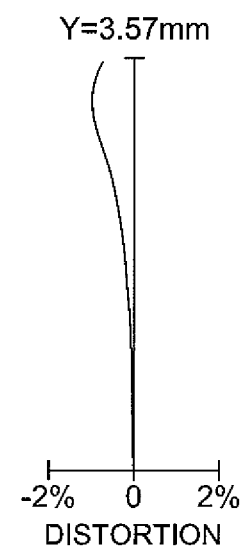

FIGS. 20a, 20b and 20c show aberration diagrams (spherical aberration, astigmatism, distortion) of the image pickup lens of Example 8. The first lens and the second lens are formed of glass and the third lens and the fourth lens are formed of plastic materials.

Values corresponding to conditional expressions in the respective Examples will be shown in the following Conditional expression calculation data 1, and Conditional expression calculation data 2.

Conditional Expression Calculation Data 1

| | Example 1 | Example 2 | Example 3 | Example 4 |
|---|---|---|---|---|
| (1) (r1 + r2)/(r1 − r2) | 0.42 | 0.44 | 0.57 | 0.61 |
| (2) (r3 + r4)/(r3 − r4) | 2.19 | 1.09 | 1.86 | 2.81 |
| (3) f1/f | 0.71 | 0.61 | 0.67 | 0.72 |
| (4) (r5 + r6)/(r5 − r6) | 1.76 | 3.37 | 2.82 | 2.27 |
| (5) ν1 − ν2 | 35.1 | 37.9 | 28.8 | 37.2 |
| (6) n2 | 1.81 | 1.81 | 1.83 | 1.83 |
| (7) L/2Y | 0.966 | 0.966 | 0.966 | 0.966 |
| (8) f/2Y | 0.672 | 0.668 | 0.665 | 0.662 |

Conditional Expression Calculation Data 2

| | Example 5 | Example 6 | Example 7 | Example 8 |
|---|---|---|---|---|
| (1) (r1 + r2)/(r1 − r2) | 0.29 | 0.35 | 0.85 | 0.88 |
| (2) (r3 + r4)/(r3 − r4) | 1.30 | 2.35 | 5.04 | 4.47 |
| (3) f1/f | 0.60 | 0.76 | 0.99 | 0.93 |
| (4) (r5 + r6)/(r5 − r6) | 3.36 | 1.71 | 1.45 | 1.45 |
| (5) ν1 − ν2 | 27.8 | 26.2 | 62.3 | 57.4 |
| (6) n2 | 1.81 | 1.62 | 1.93 | 1.85 |
| (7) L/2Y | 0.965 | 0.976 | 1.13 | 1.05 |
| (8) f/2Y | 0.665 | 0.685 | 0.792 | 0.700 |

Because refractive index of plastic materials greatly change when a temperature changes, when all the first through fourth lenses are formed by plastic lenses, a position of the image point of the whole system of the image pickup lens can be changed by the ambient temperature change, which is a problem. In such an image pickup lens with specifications such that the inflection in position of the image point cannot be ignored, this problem about temperature characteristics can be reduced by forming the positive first lens and the negative second lens into lenses formed of glass material (for example, glass mold lenses), and forming the positive third lens and the negative fourth lens into plastic lenses, and by distributing refractive power so as to offset the fluctuations in position of the image point caused when the temperature changes of the third lens and the fourth lens each other, as shown in the above Examples. When glass mold lenses are used, glass material with glass transition points (Tg) of 400° C. or less is preferably used to prevent wear of a mold as much as possible.

Recently, it has been found that change of a plastic material by a temperature can be suppressed small by mixing inorganic microparticles in a plastic material. Described in detail, if microparticles are mixed in a transparent plastic material, light generally scatters therein and it causes lowered transmittance. Therefore, it has been difficult to use such a material as an optical material. However, by making a size of microparticles to be smaller than a wavelength of a transmitting light flux, occurrence of light scattering can be prevented substantially. In a plastic material, refractive index decreases when a temperature rises. In inorganic micorparticles, refractive index increases when a temperature rises. By using those temperature dependencies to make the temperature dependencies offset with each other, it is possible to provide a material in which the change because of the temperature does not cause substantially. Specifically, it is possible to offer a plastic material with extremely low temperature dependency of refractive index by dispersing inorganic particles whose maximum size is 20 nanometers or less into a plastic material serving as a base material. For example, when inorganic particles formed of niobium oxide ($Nb_2O_5$) are dispersed in acrylic resin, it is possible to reduce the change in refractive index caused by temperature change. In the present invention, when employing such a plastic material in which inorganic particles are dispersed for one of two positive lenses (L1 and L3) or every lens (L1 through L4), it is possible to control the fluctuation in position of the image point caused when the temperature of the total system of the image pickup lens changes, to be small.

Here, the change in refractive index because of temperature will be described in detail. The change in refractive index because of temperature A is represented by (Math. 2) by differentiating refractive index n with temperature t based on Lorentz-Lorenz's formula.

$$A = \frac{(n^2+2)(n^2-1)}{6n}\left\{(-3\alpha) + \frac{1}{[R]}\frac{\partial[R]}{\partial t}\right\}$$ [Math. 2]

In the expression, α represents the coefficient of linear expansion and [R] represents molecular refraction. In the case of plastic material, contribution of the second term in the expression is small in general, compared with the first term of the expression, and it is substantially negligible. To give an example of PMMA resin, coefficient of linear expansion α is $7 \times 10^{-5}$, and when it is substituted in the aforesaid expression, $A = -1.2 \times 10^{-4}/°$ C. holds, which almost agrees with an actual measurement.

Specifically, it is preferable to control the change in refractive index caused by temperature change A which has been about $-1.2 \times 10^{-4}/°$ C., to be less than $8 \times 10^{-5}/°$ C. in terms of an absolute value. It is preferable to control it to be less than $6 \times 10^{-5}/°$ C. in terms of an absolute value.

The changes in refractive index caused by temperature change A (=dn/dT) of plastic materials which are applicable to the present invention will be shown in the following Temperature change data

| Temperature change data | |
|---|---|
| Plastic materials | A (Approximate value) [$10^{-5}/°$ C.] |
| Polyolefin | −11 |
| Polycarbonate | −14 |

The invention claimed is:

1. An image pickup lens for forming an image onto a photoelectric conversion section of a solid-state image pickup element, the image pickup lens comprising, in order from an object side thereof:
    an aperture stop;
    a first lens with a positive refractive power;
    a second lens with a negative refractive power;
    a third lens with a positive refractive power; and
    a fourth lens with a negative refractive power whose object-side surface is a convex surface,
    wherein the image pickup lens satisfies the following conditional expressions (1) and (2):

$0.29 \leq (r1+r2)/(r1-r2) < 0.9$ (1)

$0.80 < (r3+r4)/(r3-r4) < 5.1$ (2)

where r1 is a curvature radius of an object-side surface of the first lens,
    r2 is a curvature radius of an image-side surface of the first lens,
    r3 is a curvature radius of the object-side surface of the second lens, and
    r4 is a curvature radius of an image-side surface of the second lens.

2. The image pickup lens of claim 1, wherein the first lens satisfies the following conditional expression (3):

$0.55 < f1/f < 1.1$ (3)

where f1 is a focal length of the first lens, and f is a focal length of a total system of the image pickup lens.

3. The image pickup lens of claim 1, wherein an image-side surface of the fourth lens is formed in an aspheric shape having negative refractive power which becomes smaller at a position on the surface, as the position becomes more distant from an optical axis toward a peripheral portion, and the aspheric shape includes an inflection point.

4. The image pickup lens of claim 1, wherein the third lens satisfies the following conditional expression (4):

$1.4 < (r5+r6)/(r5-r6) < 2.5$ (4)

where r5 is a curvature radius of the object-side surface of the third lens, and r6 is a curvature radius of an image-side surface of the third lens.

5. The image pickup lens of claim 1, wherein the first lens and the second lens satisfy the following conditional expression (5):

$25 < v1 - v2 < 65$ (5)

where v1 is an Abbe number of the first lens, and v2 is an Abbe number of the second lens.

6. The image pickup lens of claim 1, wherein the second lens satisfies the following conditional expression (6):

$1.6 < n2 < 2.1$ (6)

where n2 is a refractive index of the second lens.

7. The image pickup lens of claim 1, wherein each of the first lens and second lens is formed of a glass material, and each of the third lens and fourth lens is formed of a plastic material.

8. An image pickup apparatus comprising:
    the image pickup lens of claim 1.

9. A mobile terminal comprising:
    the image pickup apparatus of claim 8.

* * * * *